(12) United States Patent
Stapp et al.

(10) Patent No.: US 7,152,117 B1
(45) Date of Patent: Dec. 19, 2006

(54) TECHNIQUES FOR DYNAMIC HOST CONFIGURATION USING OVERLAPPING NETWORK

(75) Inventors: Mark Stapp, Belmont, MA (US); Kenneth Kinnear, Jr., Boxborough, MA (US); Richard A. Johnson, Santa Barbara, CA (US); Jayadev Kumarasamy, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 738 days.

(21) Appl. No.: 10/053,759

(22) Filed: Jan. 18, 2002

Related U.S. Application Data (63) Continuation-in-part of application No. 09/972,139, filed on Oct. 4, 2001.

(51) Int. Cl.
*G06F 15/16* (2006.01)

(52) U.S. Cl. ...................................... 709/245; 709/224

(58) Field of Classification Search ................ 709/220, 709/226, 227, 224, 229, 245, 223, 219; 370/469, 370/349, 379, 352, 331, 466, 257, 474; 718/104
See application file for complete search history.

(56) References Cited

U.S. PATENT DOCUMENTS

| | | | |
|---|---|---|---|
| 5,790,548 A * | 8/1998 | Sistanizadeh et al. ........ 370/401 |
| 5,835,723 A * | 11/1998 | Andrews et al. ............ 709/226 |
| 5,848,223 A | 12/1998 | Radia et al. |
| 5,884,024 A | 3/1999 | Lim et al. |
| 5,987,524 A * | 11/1999 | Yoshida et al. ............. 709/245 |
| 6,009,103 A | 12/1999 | Woundy |
| 6,023,724 A | 2/2000 | Bhatia et al. |
| 6,065,055 A | 5/2000 | Hughes et al. |
| 6,078,582 A | 6/2000 | Curry et al. |
| 6,151,631 A * | 11/2000 | Ansell et al. ............... 709/229 |
| 6,154,465 A | 11/2000 | Pickett |
| 6,172,986 B1 * | 1/2001 | Watanuki et al. ........... 370/466 |
| 6,178,455 B1 | 1/2001 | Schutte et al. |
| 6,219,697 B1 | 4/2001 | Lawande et al. |
| 6,266,341 B1 | 7/2001 | Surprenant et al. |
| 6,289,025 B1 | 9/2001 | Pang et al. |
| 6,343,324 B1 * | 1/2002 | Hubis et al. ................ 709/229 |
| 6,389,472 B1 | 5/2002 | Hughes et al. |
| 6,393,484 B1 | 5/2002 | Massarani |
| 6,396,849 B1 | 5/2002 | Sarkissian et al. |
| 6,405,251 B1 * | 6/2002 | Bullard et al. .............. 709/224 |
| 6,424,659 B1 * | 7/2002 | Viswanadham et al. .... 370/469 |

(Continued)

OTHER PUBLICATIONS

Multicast Address Alloctation Protocol (AAP)—Handley (1997) www.aciri.org/malloc/draft-handley-aap-00.ps.*

(Continued)

*Primary Examiner*—Thong Vu
(74) *Attorney, Agent, or Firm*—Hickman Palermo Truong & Becker LLP (57) ABSTRACT

Techniques for managing leased network addresses for multiple networks using overlapping address spaces include storing banks of addresses corresponding to the multiple networks. A request for a network address for a host on a first network is received from a relay agent on an intermediate device. The request includes a qualifier associated with the first network by the relay agent. A first bank of addresses is selected based on the qualifier. A first network address from the first bank is identified based at least in part on the request. A response for the host is sent to the relay agent. The response indicates the first network address and the qualifier. Thus a dynamic host configuration protocol (DHCP) server can provide the same network address for several hosts spread over different networks, such as different virtual private networks (VPNs).

23 Claims, 6 Drawing Sheets

U.S. PATENT DOCUMENTS

| | | | |
|---|---|---|---|
| 6,425,003 B1* | 7/2002 | Herzog et al. | 709/223 |
| 6,515,974 B1* | 2/2003 | Inoue et al. | 370/331 |
| 6,578,074 B1* | 6/2003 | Bahlmann | 709/220 |
| 6,598,057 B1* | 7/2003 | Synnestvedt et al. | 707/200 |
| 6,678,732 B1* | 1/2004 | Mouko et al. | 709/227 |
| 6,754,492 B1 | 6/2004 | Stammers et al. | |
| 6,765,931 B1 | 7/2004 | Rabenko et al. | |
| 6,801,507 B1* | 10/2004 | Humpleman et al. | 370/257 |
| 6,817,519 B1* | 11/2004 | Yasushi et al. | |
| 6,826,611 B1* | 11/2004 | Arndt | 709/226 |
| 6,829,235 B1* | 12/2004 | Musiol | 370/352 |
| 6,845,094 B1* | 1/2005 | Zhang | 370/349 |
| 6,871,346 B1* | 3/2005 | Kumbalimutt et al. | 718/104 |
| 6,901,073 B1 | 5/2005 | Wright et al. | |
| 6,973,102 B1 | 12/2005 | Karagiannis et al. | |
| 2002/0016858 A1 | 2/2002 | Sawada et al. | |
| 2002/0062485 A1 | 5/2002 | Okano et al. | |
| 2003/0001883 A1* | 1/2003 | Wang | 345/736 |
| 2003/0009537 A1* | 1/2003 | Wang | 709/219 |
| 2003/0069948 A1 | 4/2003 | Ma et al. | |
| 2003/0093187 A1* | 5/2003 | Walker | 701/1 |

OTHER PUBLICATIONS

Network Working Group E. Rosen Request for Comments: 2547 Y.. www.tzi.de/~cabo/pdfrfc/rfc2547.txt.pdf.*

First-Class User-level Threads—Marsh, Scott, LeBlanc, Markatos (1991) www.informatik.hu-berlin.de/~mueller/concur/firstclass.ps.gz.*

LANutil32 Suite User Manual; www.vector-networks.com/luvms/manual/lup020.htm.*

TCPware Installation & Configuration Guide Customizing Configuration vms.process.com/tcpware/iccuconf.htm.*

Qualifier(s):; nssdc.gsfc.nasa.gov/cdf/manual/node140.html.*

"Network Address Translators (NATs) Can Block Netlogon Traffic (Q172227)," Microsoft Product Support Services article, Microsoft Corporation, Aug. 10, 2001.

Anonymous, "IETF Network Working Group, Protocol Standard For A NetBIOS Service On A TCP/UDP Transport: Concepts And Methods," Request for Comments 1001, Mar. 1987.

R. Droms, "Dynamic Host Configuration Protocol," IETF Network Working Group, Request for Comments 2131, Mar. 1997.

S. Alexander et al., "DHCP Options and BOOTP Vendor Extensions," IETF Network Working Group, Request for Comments 2132, Mar. 1997.

P. Srisuresh et al., "Traditional IP Network Address Translator (Traditional NAT)," IETF Network Working Group Request for Comments 3022, Jan. 2001.

Primarity Disconnected Operation: Experiences with Ficus-Heidemann (1992) ftp.cs.ucla.edu/pub/ficus/WorkMgtReplData_92.ps.gz.

A Network-Conscious Approach to End-to-End Video Delivery. . -Wang, Zhang, Du, Su (1998), www.cs.umn.edu/~zhzhang/Papers/Wang98:Network.pz.

Video Staging: A Proxy-Server-Based Approach to End-to-End. . -Zhi-Li Zhang Yuewei (2000), www.cs.umn.edu/~zhzhang/Papers/Zhan00:Video-Staging.px.

A Caching DHCP Relay Agent-Fry, Knight; www.cs.rpi.edu/tr/97-10.ps.

Using Leases to Support Server-Driven Consistency in. . . -Jian Yin Lorenzo (1998); www.cs.utexas.edu/users/yin/papers/icds98.ps.

Nomadic Metacomputing-Fry; www.cs.rpi.edu/~frp/papers/candidacy/proposal/ps.

* cited by examiner

TECHNIQUES FOR DYNAMIC HOST CONFIGURATION USING OVERLAPPING NETWORK

CROSS-REFERENCE TO RELATED APPLICATIONS

This application claims domestic priority under 35 U.S.C. § 120 as a Continuation-in-part from prior application Ser. No. 09/972,139, filed Oct. 4, 2001, "Techniques for Dynamic Host Configuration Without Direct Communications Between Client and Server," of Kenneth Kinnear Jr. et al., the entire contents of which are hereby incorporated by reference as if fully set forth herein.

FIELD OF INVENTION

The present invention generally relates to dynamic host configuration on a network. The invention relates more specifically to techniques for dynamic host configuration using overlapping network addresses.

BACKGROUND OF THE INVENTION

A computer network includes computer processors or "hosts" that host software applications that provide or request services, or both. The hosts may be network terminals or end stations that do not perform network traffic routing or forwarding functions. The hosts communicate with each other through network devices, such as switches and routers, sometimes called intermediate devices, which do perform routing and forwarding functions. When a host is added to a network by connecting directly to another host, or indirectly to another host through one or more intermediate devices, the host must be configured for network operations. For example, the newly added host is assigned a logical network address for itself, and a network address for the intermediate device that routes or forwards its traffic, among other configuration information.

Computer networks that employ the Transmission Control Protocol and Internet Protocol (TCP/IP) for sending packets of information between devices on the network are proliferating, and, as a result, logical network addresses that are used to locate each device on the network have become scarce. Further, in many local networks with many different computers, the number and location of the computers connected to the network may change regularly. In addition, of the many computers physically connected at one time, only a fraction of the computers are on and operating at one time. Thus one or more hosts are being added and dropped frequently.

A specific context in which this problem arises involves large-scale cable modem networks in which voice and other services are delivered over an Internet Protocol network that uses coaxial cable for communications. Addresses are dynamically assigned to cable modems of end users as the users subscribe to and terminate use of service, and to devices that cannot persistently store an address. In this context, it is wasteful to give every device a unique and permanent network address. A number of addresses sufficient for the total anticipated subscriber base can be shared; but configuring each host with a new address is a tedious process to perform manually.

The Dynamic Host Configuration Protocol (DHCP) provides a mechanism through which computers using TCP/IP can obtain network addresses and other configuration information automatically. DHCP is an open standard protocol for dynamic host configuration described in request for comments (RFC) documents numbered 2131 and 2132 available at the time of this writing as files rfc2131.txt and rfc2132.txt, respectively, on the worldwide web (www) at domain and directory ietf.org/rfc. A DHCP server process operates on a DHCP server host that is conveniently located for several hosts on one or more local networks. One or more DHCP server hosts and processes are set up by a system administrator with information to configure the hosts on one or more local networks to reflect the current architecture of those local networks. A DHCP client process operates on each host of the local networks. As used hereinafter, a server refers to the server process and a client refers to the client process unless otherwise indicated to refer to the host or device on which the process executes.

When a host begins operations on the local network, the DHCP client on that host requests configuration information from one of the DHCP servers. In response to the request from the DHCP client, one or more of the DHCP servers respond with configuration information to be used by the host of the DHCP client for a predetermined period of time ("lease time"), including an IP address for the host of the DHCP client. Each DHCP server maintains a pool of available IP addresses and a data structure where IP addresses already leased are stored. The responses from the DHCP servers take the form of "offers" of data. In a subsequent message, the DHCP client notifies the servers that one of the offers is accepted. The host that is executing the DHCP client then uses the configuration information including the address. The configuration information is bound to the particular DHCP client, and the binding is recorded by the DHCP server that offered it by storing data indicating the binding in the data structure of leased IP addresses. In other DHCP messages, the DHCP client renews the leased IP address; a client may use Address Resolution Protocol (ARP) or an equivalent to check that a particular IP address is not in use by other hosts.

DHCP servers and clients have greatly simplified the task of configuring hosts that join a network. One set of one or more DHCP servers can be configured to provide network addresses for several networks.

Sometimes it is desirable to use a set of DHCP servers to assign IP addresses for several networks using overlapping IP addresses. Multiple networks are said to use overlapping addresses when the multiple networks use one or more addresses that are the same. For example, it is desirable to use DHCP servers to provide addresses for several virtual private networks. Since the hosts on one virtual private network (VPN) do not communicate directly with hosts in a second VPN, both the first VPN and the second VPN are allowed to use the same IP addresses. In fact, the IP standard reserves a particular range of network addresses for use by private networks, such as VPNs. As another example, a retailer may plan to configure multiple stores, each store with the same arrangement of hosts and IP addresses for those hosts in a local private network. It would be desirable for a corporate network to use one DHCP server to provide IP addresses for the private networks at all the stores.

However, conventional DHCP servers cannot be used if multiple networks have overlapping address spaces. Many DHCP servers use the IP address to compare information in the pool of available addresses and the information in the data structure of leased IP addresses. Furthermore, if several DHCP servers are used in concert, it is typical to allocate a unique set of addresses to the pool of each DHCP server. If allowed to store overlapping addresses, these servers may perform incorrectly. Thus a set of DHCP servers is often not allowed to store pools of addresses that include the same address more than once.

Further, some messages directed to the DHCP client from the DHCP server, after the initial offer, use the leased IP address of the DHCP client as the destination address for the message. The address in the destination for the message is not unique if the same IP address is also used on another network. In this situation intermediate devices cannot guarantee delivery to the correct host and may be unable to deliver the message at all.

Based on the foregoing, there is a clear need for techniques that dynamically assign network addresses for multiple private networks that use overlapping network addresses.

SUMMARY OF THE INVENTION

The foregoing needs, and other needs and objects that will become apparent from the following description, are achieved in the present invention, which comprises, in one aspect, a method for managing leased network addresses for multiple networks using overlapping address spaces. The method includes storing banks of addresses corresponding to the multiple networks. At least one particular set of one or more network addresses is included in more than one bank. A request for a network address for a host on a first network is received from a relay agent on an intermediate device connected to the first network. The request includes a qualifier associated with the first network by the relay agent. A first bank of addresses is selected based on the qualifier. A first network address from the first bank is identified based at least in part on the request. A response for the host is sent to the relay agent. The response indicates the first network address and the qualifier.

According to another aspect of the invention, a method for managing leased network addresses for multiple networks using overlapping address spaces includes receiving a first request for a network address from a host on a first network. The first request is received at a relay agent executing on an intermediate device connected to the first network. A particular qualifier is associated with the first network. A second request for a network address for the host is sent to a configuration server. The second request includes the particular qualifier.

In other aspects, the invention encompasses an apparatus, a computer apparatus, and a computer readable medium, including a carrier wave, configured to carry out the foregoing steps.

Using these techniques, a configuration server, such as a DHCP server, can provide the same network address for several hosts spread over different networks, such as different VPNs. The relay agents on the intermediate devices sends the configuration information to the proper host based on the qualifier, such as the VPN name, included in the messages between relay agent and configuration server.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for managing leased network addresses is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

To illustrate dynamic host configuration, embodiments of the invention are described in the context of the dynamic host configuration protocol (DHCP) for two virtual private networks (VPNs) that use overlapping network address spaces. However, embodiments are not limited to this context. Other embodiments involve other network architectures, such as use of overlapping address spaces in multiple local networks in stores of a retail company, among others. Other embodiments may involve network dynamic configuration protocols other than DHCP.

EXAMPLE MULTIPLE PRIVATE NETWORKS

Figure 1:
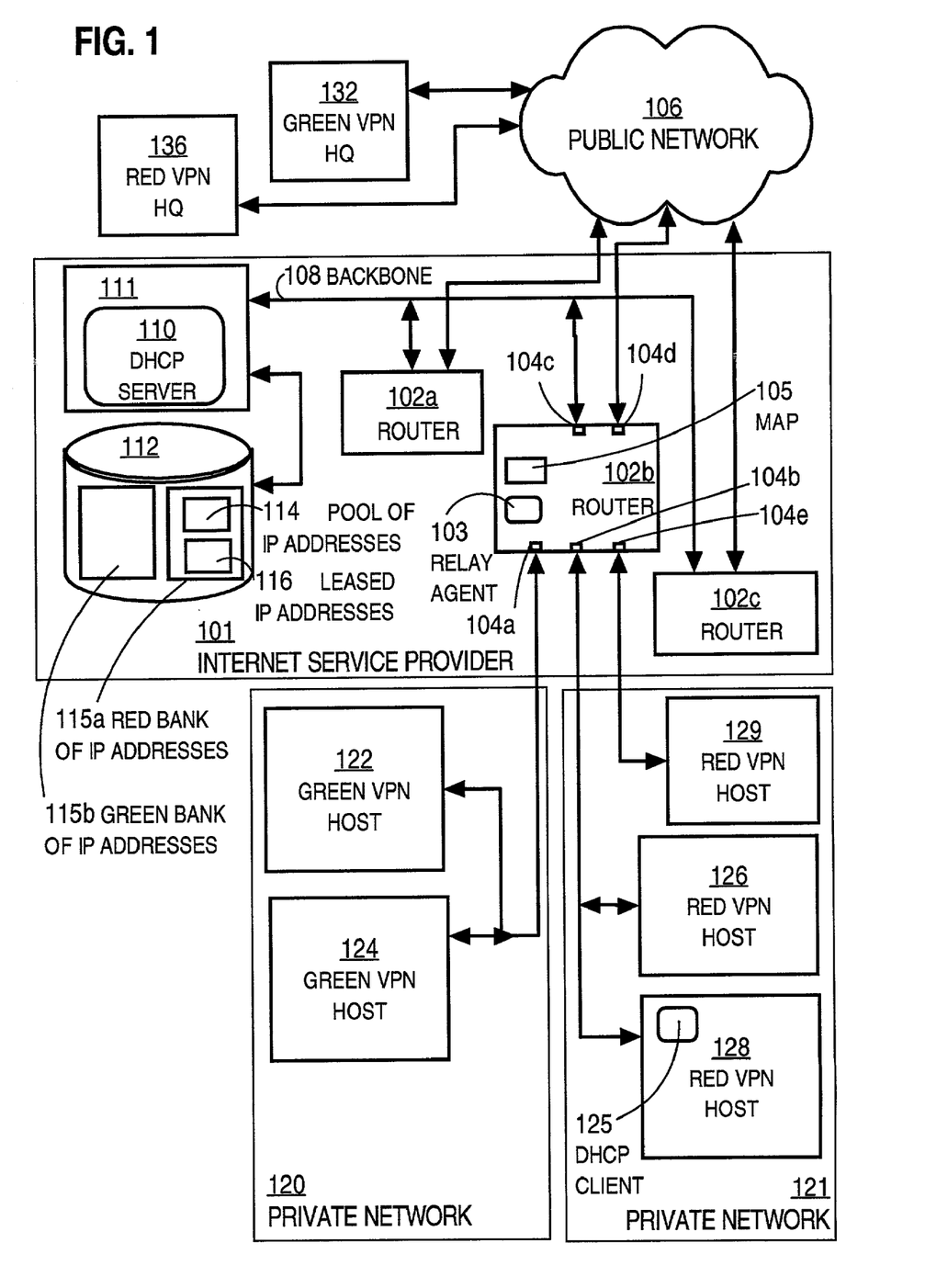
FIG. 1 is a block diagram that illustrates multiple networks using overlapping address spaces with a dynamic host configuration server, according to an embodiment.

FIG. 1 is a block diagram that illustrates multiple private networks using overlapping address spaces, according to an embodiment.

According to the illustrated example, an Internet service provider (ISP) 101 maintains a plurality of routers 102a, 102b, 102c, collectively referenced as routers 102, for accepting traffic from one or more local networks, such as private networks 120, 121. The routers 102 of ISP 101 also place that traffic onto a public network 106, such as the Internet. Traffic refers to the flow of one or more data packets over a network. Each router has multiple interfaces for physical connections to other devices or networks of devices. For example, router 102b includes five interfaces 104a, 104b, 104c, 104d, 104e, among others.

The ISP 101 provides multiple virtual private networks (VPNs) for one or more customers of the ISP. In a VPN all data packets transferred over the public network 106 are encrypted. Routers participating in a VPN enforce special packet forwarding rules that are applied to packets entering the VPN. When a standard packet forwarding rule might direct a packet out into the public Internet, the VPN packet forwarding rules direct the packet to an encryption endpoint, and from there into the HQ network. The local network then usually treats the packet as a normal packet from inside the HQ network, and applies its normal forwarding rules to it.

For example, referring to FIG. 1, assume that an additional non-VPN host is connected to an interface on router 102a. When that host sends a packet to DHCP server 111, the packet arrives first at router 102a. The router 102a examines the destination address, and determines that it has an interface on the backbone connection 108 to which DHCP server 11 is connected. Router 102a makes such determination based on a routing rule that expresses the notion, "determine the best next hop towards the destination of this packet." Accordingly, router 102a forwards the packet on its interface to the backbone.

If a packet from host 124 directed to DHCP server 111 arrives on interface 104a of router 102b, different processing occurs. Interface 104a is part of a VPN, and therefore VPN forwarding rules are applied. The VPN forwarding rules express the notion, "forward all traffic down the encrypted VPN to the home (HQ) network." In effect, the forwarding rules of the green VPN instruct router 102b to treat VPN clients as if they are on the HQ net. The rules typically would direct router 102b to send the encrypted packet to the green HQ network. The packet then travels across the Internet, and arrives at the edge of the green network. At that point, it is decrypted, and the green HQ routers determine that the packet is destined for DHCP server 11.

Because the address of DHCP server 111 is on the service provider's internal network, the address may not be reachable from the outside at all; for example, it may be a private, non-routable address. Or, DHCP server 111 may have a routable address, but a firewall of the service provider may block outside access to it. If DHCP server 111 is reachable from the green HQ, then the packet would be sent back across the Internet to an edge router of the service provider. Thus, to get from host 124 to server 111, the packets have to cross into the VPN HQ's network, and back again. The forwarding rules that are applied are those of the green HQ, not the rules for non-VPN traffic. Further, the HQ's forwarding rules may prevent VPN hosts from reaching the DHCP server 111.

In some cases, multiple interfaces can be associated with the same VPN. For example, interfaces 104b and 104e on router 102b are associated with a second VPN designated here as the red VPN. Data packets received on interface 104b may be forwarded if the destination IP address identifies host 136, the headquarters (HQ) for the red VPN or another red VPN host connected to interface 104e.

FIG. 1 also illustrates hosts 122, 124, 126, 128, 129 on internal networks 120, 121 that are connected directly to router 102b of ISP 101. Hosts 122 and 124 are on a segment of an internal network 120 in the green VPN and are connected to interface 104a of router 102b. Hosts 126 and 128 are on one segment of an internal network 121 in the red VPN and are connected to interface 104b of router 102b. Host 129 is also on the red VPN, but is on a different segment connected to interface 104e of router 102b. A network segment consists of all devices not separated by intermediate devices, and the one or more intermediate devices contiguous with those devices. For example, in FIG. 1, hosts 126 and 128 and router 102b constitute one network segment. Similarly, hosts 122, 124 and router 102b constitute another segment. Similarly DHCP server device 111 and routers 102a, 102b, 102c constitute another network segment. Another segment consists of host 129 and router 102b.

The ISP provides configuration information for hosts 122, 124, 126, 128, 129 on several networks using a single DHCP server 110, as described in more detail below with reference to FIG. 3.

A DHCP client process executes on each host of the internal networks. For example, DHCP client 125 runs on host 128 on the red VPN. The DHCP client requests configuration information from a DHCP server when the client joins the network and when the lease on the configuration information is about to expire. In a conventional arrangement, one or more DHCP servers are provided on each VPN.

EXAMPLE EMBODIMENT

According to an illustrated embodiment, the ISP provides one DHCP server 110 that supports multiple VPNs. In other embodiments, multiple DHCP servers each support multiple VPNs. ISP 101 provides DHCP server 110 executing on a server device 111 that is connected to all the routers through a backbone connection 108. The server device 111 is also connected to a persistent storage device 112 including a database.

A relay agent runs on the routers 102 to facilitate communication between the DHCP clients and DHCP servers. For example, relay agent 103 on router 102b facilitates communication between DHCP client 125 on host 128 and DHCP server 110 on device 111. By definition, an intermediate device, such as router 102b, always lies between a DHCP client on a VPN and a DHCP server outside the VPN.

According to the illustrated embodiment, the relay agent is configured with the addresses of the DHCP server or servers to which it should send messages that it processes. The relay agent takes advantage of its host router's presence on both the VPN network(s) and the internal network of the service provider, which may also be a VPN. The relay agent can receive DHCP messages from clients on VPN networks, and forward them to other networks, such as the DHCP server's network.

According to embodiments of the invention, relay agents maintain a map data structure (a "map") for storing an association between each interface on the intermediate device and a qualifier that uniquely indicates one private network. For example, relay agent 103 maintains map 105 on router 102b. As described in more detail below, the relay agent adds information from the map data structure to messages passed to the DHCP server from the DHCP client.

The DHCP server communicating with the modified relay agent is faced with a challenge not faced by DHCP servers working with conventional relay agents. The challenge is raised because the different VPNs are allowed to use overlapping address spaces, including the same network address space. The conventional DHCP servers are not designed to manage overlapping address spaces. First, the conventional DHCP servers are not designed to assign the same address to multiple hosts. Second, the conventional DHCP servers and relay agents often communicate with the DHCP clients using the assigned IP addresses as destination addresses, and such communications may fail when different DHCP clients are on hosts that have the same address. Thus, according to embodiments of the invention, the DHCP server is also modified to allow overlapping address spaces in the networks managed by the DHCP server.

According to embodiments of the invention, the modified DHCP server is connected to a persistent storage device 112 that includes multiple data structures 115a, 115b, collectively referenced as data structure 115, for storing separate banks of IP addresses for the separate private networks. Each bank data structure 115 ("bank") includes a pool data structure 114 (a "pool") that stores a pool of IP addresses available for binding to a host on one network. Each bank 115 also includes a leased data structure 116 that stores information about particular configuration data, including a particular leased IP address, bound to a particular host by the DHCP server for hosts on the one network.

According to embodiments of the invention, the DHCP server uses the information from the relay agent to select one bank of IP addresses from the multiple banks maintained at the server. The DHCP server also uses the information from the relay agent to identify a DHCP client to receive a response generated by the DHCP server.

DHCP Messages

Figure 2:
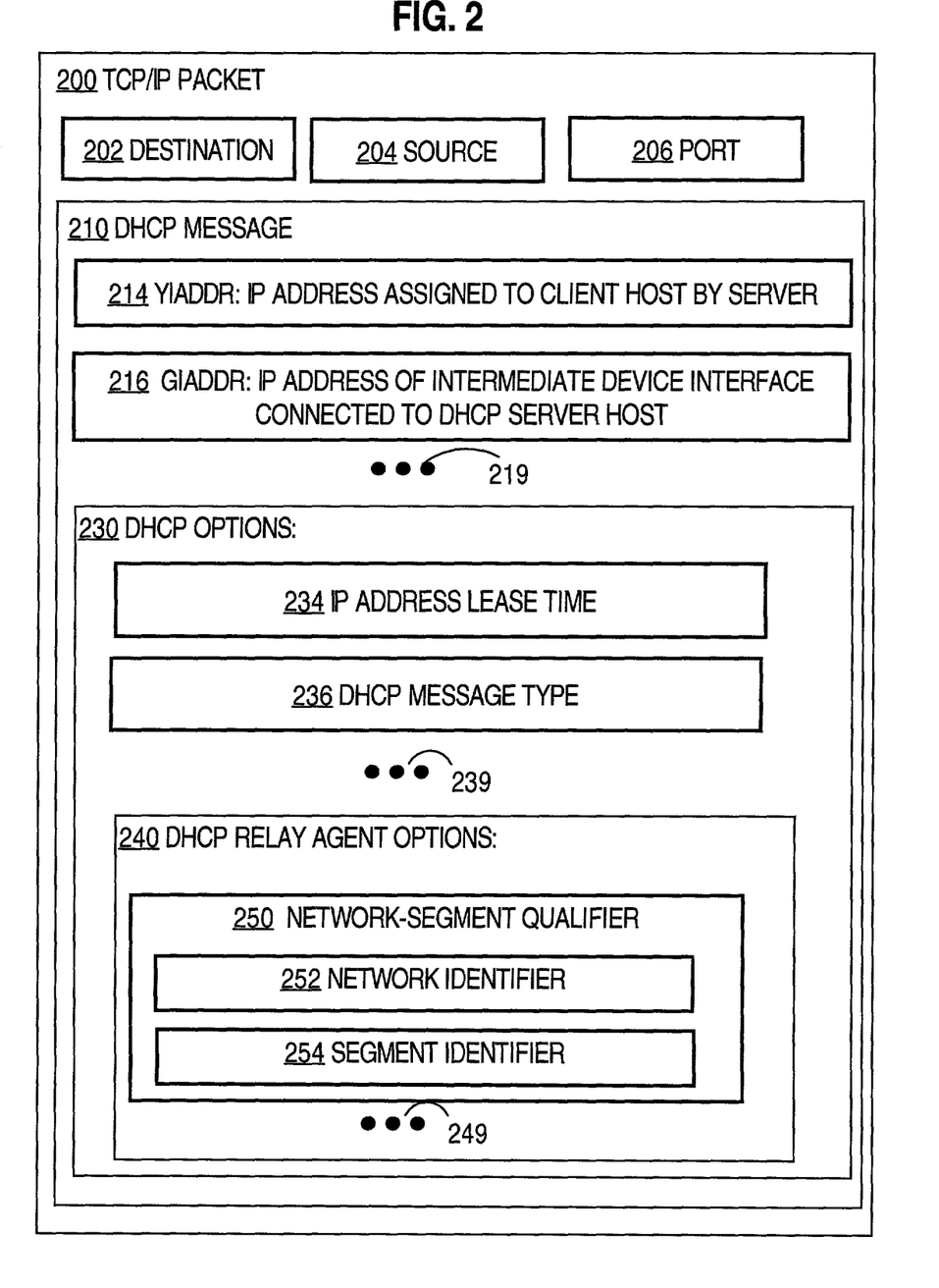
FIG. 2 is a block diagram that illustrates a packet including a message used to communicate with a dynamic host configuration server, according to an embodiment.

FIG. 2 is a block diagram that illustrates a packet 200 including a message used to communicate with a DHCP server. DHCP messages are included in transport control protocol IP (TCP/IP) data packets. TCP/IP packets include a destination field 202, a source field 204 and a destination port field 206. The destination field holds data indicating the IP address of the intermediate device or host that is to receive the TCP/IP packet. Routers efficiently transmit TCP/IP packets using hardware configured to interpret the destination address in destination field 202. The source field holds data indicating the IP address of the intermediate device or host that sent the TCP/IP packet. The destination port field holds data indicating the service requested on the destination device, so that the destination device provides the packet to the appropriate server process executing on the destination device.

The TCP/IP packet includes payload data that is not used by TCP/IP to transfer packets. The illustrated embodiment includes a DHCP message 210 in the data payload. A DHCP message 210 includes a set of fields used in an earlier protocol for passing IP addresses, and a set of fields in a DHCP options portion 230 of the DHCP message.

The fields of the earlier protocol include the yiaddr field 214 and the giaddr field 216, among others. The yiaddr field 214 holds a value for an IP address just assigned to the host of a DHCP client communicating using packet 200, if any. At first the yiaddr field 214 is empty, but in some responses, such as an offer response from the DHCP server, a value is included in the yiaddr field 214. The giaddr field 216 holds a value for an IP address of the interface of the intermediate device connected to the server device, if any intermediate device is between the server and the client. In the initial message from the DHCP client, the giaddr field 216 is empty, but after a relay agent has processed the request, a value provided by the relay agent is included in the giaddr field 216. For example, a value for the IP address of interface 104c of router 102b is included in the giaddr field 216.

Embodiments involve modifying the relay agent and DHCP server to change the use of the giaddr field as well as adding new information in the relay-agent information sub-options. Specifically, in normal DHCP message exchanges involving a relay, giaddr is set to the address of the interface on the client's network, which is usually the interface that received the client's broadcast packet. However, giaddr is not usually set to the address of an upstream interface that is away from the client. In the overlapping case, the server may not be able to send replies to the interface attached to the client, because that interface may not have a unique IP address, or might be part of a VPN to which the server cannot send messages directly. The relay needs to provide the DHCP server with an address that the server can reach in the overlapped and VPN cases, but there is no requirement that the address is that of the interface connected to the DHCP server. Accordingly, in the example above, when a normal DHCP exchange with a client attached to interface 104b is carried out, giaddr is set to the address of the router having interface 104b. In the special cases in which interface 104b might not be reachable by the DHCP server, the relay uses another address, such as 104c.

The fields in the DHCP options portion include IP-lease-time field 234 and the DHCP message-type field 236, among others. The IP-lease-time field 234 holds a value for a lease time assigned by the server, during which the host of the client may use the address in yiaddr field 214. The DHCP message-type field 236 holds data that indicates the type of message, such as the initial request (a "DHCPDISCOVER" message type) and a renewal request (a "DHCPREQUEST" type), and the response with an offer (an "DHCPOFFER" type), among others.

A DHCP message 210 may include, in the DHCP options portion 230, a set of fields in a DHCP relay agent options portion 240 of the DHCP message. The relay agent options portion 240 contains data added by the relay agent on the intermediate device between the DHCP server and the DHCP client, used by the server, echoed back to the relay by the server, and then used by the relay as it forwards the server's reply message back to the client. According to an embodiment of the invention, the fields in the DHCP relay agent options portion 240 include a qualifier field 250 that includes data indicating a network and a segment connected to the relay agent. In the illustrated embodiment the network-segment qualifier field 250 includes a network identifier field 252 and a segment identifier field 254.

Functional Overview

Figure 3:
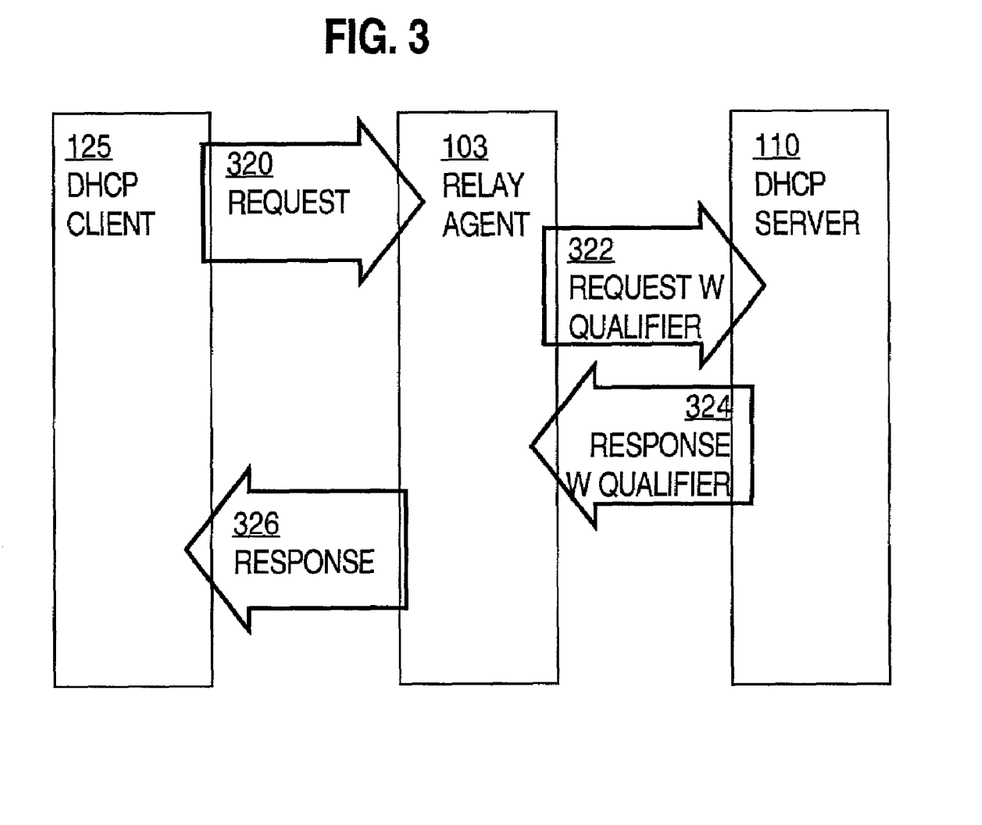
FIG. 3 is a time line diagram that illustrates a sequence of messages passed between a host, an intermediate device and a dynamic host configuration server, according to an embodiment.

FIG. 3 is a time line diagram that illustrates a sequence of messages passed between a host that is a requesting DHCP client, an intermediate device executing a relay agent, and a dynamic host configuration server, according to an embodiment.

At time tA, a DHCP request message 320 is sent to the relay agent. For example, a DHCP message of type DISCOVER is sent from DHCP client 125 in a broadcast packet. A broadcast is indicated by a special value in the destination address field 202 of the TCP/IP packet. For example, a hexadecimal value of FFFFFFFF (all ones) indicates a broadcast packet. A broadcast is a TCP/IP packet that is passed to every device on a network segment.

The DHCP client indicates the message 320 is a DHCP message by including a value in the port indicating dynamic host configuration services, e.g., by setting the port to the well-known value 67. The message includes values in fields that are used to uniquely identify the client on the segment.

The intermediate device in the segment receives the message. For example, the router 102b receives the message at interface 104b for the red VPN. Because the packet includes destination port 67, indicating a DHCP message, and the DHCP relay agent listens on port 67 and reacts to all broadcasts on that port, the DHCP relay agent 103 receives the message.

The modified relay agent 103 is configured to allow DHCP messages to be sent to DHCP server 110 on device 111, under the control of the ISP 101, and connected to router 102b by a high bandwidth backbone connection 108. The security of such traffic is consistent with the security of the VPN because the backbone 108 and device 111 are within the physical control of the trusted ISP 101 providing the VPN.

The relay agent determines that the DHCP servers on the backbone connection are authorized for the DHCP messages and selects one to receive the request. For example, the relay agent 103 selects DHCP server 110 and determines to send the request to device 111.

A conventional DHCP server responds to a DISCOVER message requesting a new address by offering an address from a pool appropriate to the network where the client is located. A conventional DHCP server responds to other DHCP messages by finding the client (identified by data in its messages) in the data structure of leased addresses. As mentioned above, internal or private networks are allowed to use the same network address from a range of addresses TCP/IP has reserved for private networks. Such private addresses are not used for communication outside those private networks, such as on the public network 106 and on the backbone 108 of ISP 101. Consequently, the same address from the private range can be used by different private networks. For example, if the private range includes the addresses X.Y.Z.000 to X.Y.Z.255, then host 124 on green VPN 120 and host 128 on red VPN 128 may both use the same private address, X.Y.Z.001. Thus, the red VPN and the green VPN can use overlapping address spaces.

In a modified server that allows overlapping addresses in separate networks, the server uses information about the network to which the host belongs to select one of several pools of addresses, or to select one of several data structures of leased addresses, as described in more detail below. The modified relay agent provides the information in the form of a qualifier inserted into the message 322 sent to the server. The qualifier is associated with the network to which belongs the host making the request. The qualifier is associated with the network in a map used by the relay agent.

For example, in a map 105 on the router 102b, relay agent 103 associates a qualifier identifying the red VPN with the interfaces 104b, 104e connected to the red VPN. When the message 320 is received at interface 104b from a host on the red VPN, the relay agent 103 retrieves the qualifier associated with the red VPN from the map 105 and inserts the qualifier into the message 322. The message is then sent to the DHCP server 110.

In some embodiments, the map is formed by a network administrator or by the VPN process when the router is configured as part of a VPN. In some embodiments, the network administrator or a configuration process forms the map when the network is formed. The network administrator or the configuration process also associates the qualifier with one of the pools of addresses that are installed on the DHCP server.

In some embodiments, the qualifier identifies not only the network but also the network segment on which the host making the request belongs. To cover both embodiments, the qualifier is herein called a network-segment qualifier. For example, the IP address of the interface 104b is included as the network-segment qualifier. The network-segment qualifier is added to the requests sent to the DHCP server. The relay agent may use the qualifier to distinguish different hosts having the same IP address, because the different hosts will always be on different network segments as well as on different networks. In some embodiments, the segment-identifier is included in the map maintained by the relay agent, such as the map 105.

The modified relay agent adds the network-segment qualifier to the DHCP request messages. The DHCP standard includes parameters that can be set by the relay agent, such as the giaddr field 216. Also, the DHCP standard allows for optional parameters to be appended in the relay agent option portion 240 of the DHCP message 210. According to the illustrated embodiment, the qualifier is added as a network-qualifier field 250 in the DHCP relay agent options portion 240 of the DHCP message 210. The network-segment qualifier field 250 includes the network identifier field 252 and the segment identifier field 254.

For example, the relay agent adds a network identifier in the network identifier field 252. The network identifier can be a network name. For a VPN, the network identifier is a VPN identifier. For purposes of illustrating an example, in this description the network identifier for the green VPN is "GREEN" and the network identifier for the red VPN is "RED." In actual embodiments, any unique value may be used. The value "GREEN" is inserted in network identifier field 252 for DHCP requests that originate in hosts 122, 124 on the green VPN. The green VPN is associated with interface 104a on router 102b in map 105.

Sometimes the network name is associated with more than one segment connected to the intermediate device at more than one interface. For example, two segments of the red VPN are connected to router 102b at interfaces 104b and 104e, respectively. Thus the red VPN is associated with two interfaces 104b and 104e.

In the illustrated embodiment, the relay agent adds a segment identifier into the segment identifier field 254. For example, the red VPN segments connected to interfaces 104b, 104e can be identified by the IP addresses of those interfaces. According to this embodiment, the VPN IP address of the interface connected to the network segment associated with the host that sent the request is inserted as the segment identifier in field 254. For purposes of illustration, the value of the IP address of interface 104b is assumed to be Y.Z.1 and the IP address of interface 104e is assumed to be X.Y.Z.65. Then a value of "RED" is inserted into the network identifier filed 252 and a value of X.Y.Z.1 is inserted into the segment identifier field 254 for DHCP requests from DHCP client 125 on host 128. In some embodiments, the segment identifier is omitted from the network-segment identifier. In some embodiments, the IP address of the interface on the external network is used as the segment identifier.

In other embodiments, other data can be inserted, alone or in combination with the IP address of the interface and the VPN ID.

At time tB, a DHCP request message 322 is sent to the DHCP server. For example a DHCP message of type DISCOVER is unicast from DHCP relay agent 103 to the DHCP server 110 selected by the relay agent. The DHCP message is identified as such by setting the destination port to the well-known value 67.

At the DHCP server 110, a response 324 is generated based on the contents of message 322 and the contents of banks 115 including data structures 114 and 116. A bank is selected based on a value in the network identifier field 252 in the network-segment identifier field 250. For example, it is assumed that the value of network identifier field 252 is "RED". Then the bank 115a of addresses for the red VPN is selected. The addresses in pool 114 and data structure 116 of leased addresses in bank 115a can include the same IP addresses as the pool and data structures in bank 115b. Thus the DHCP server can provide overlapping addresses for the red and green VPNs.

For a response of type OFFER to a request of type DISCOVER, an IP address is selected from the pool of addresses in data structure 114, if any addresses are available. For example, the IP address of X.Y.Z.001 is selected from pool 114 of bank 115a. In some embodiments the segment-identifier is used to select an address from a subset of network addresses ("subnet") associated with the network segment. For an "acknowledge" (ACK) type of response to a request of type REQUEST, or a request of type RENEW, the IP address provided in the message is found in the data structure 116 of leased addresses. For example, an IP address of X.Y.Z.001 is found in the data structure 116 for leased addresses, and the configuration information associated with it is retrieved for use by the DHCP server.

The DHCP server then generates a DHCP response for a lease time or renewal or other configuration information, in any conventional manner, when the server is implemented. The configuration information associated with the address in the data structure for leased addresses is then updated, such as by entering the offered address, binding the accepted address, or extending the lease duration for the renewed address.

At time tC, the message 324 is unicast, with the port set to 67 to indicate it is a DHCP message. The message includes the IP address for the host of the client that originated the request. For example the value of yiaddr field 214 is X.Y.Z.001. The IP address in the yiaddr field 214, however, is not a valid address for the network including the backbone segment 108. Thus the response includes in field 202 a destination address of the relay agent. The destination address of the relay agent is the IP address of the interface of the intermediate device connected to the DHCP server, and is included in the giaddr field 216 of the DHCP message 322 received from the relay agent. For example, the DHCP server sends the response to the IP address of interface 104c of router 102b. It is assumed that the IP address of the interface 104c is A.B.C.031. For some responses, such as a DHCP message of type ACK, the conventional DHCP server unicasts the message to the IP address of the client. According to an embodiment, the DHCP server unicasts all responses to the intermediate device that has its address in the giaddr field 216 if such a value is present, even when sending a message that would not conventionally pass through a relay.

According to the illustrated embodiment, the message 324 includes the network-segment qualifier value received from the relay agent in message 322. For example, the message 324 includes the values "RED" and "X.Y.Z.2" in the network identifier field 252 and segment identifier field 254, respectively, of the network-segment qualifier 250 in the DHCP relay agent options portion 240 of the DHCP message 324.

In some embodiments, the intermediate device is configured to deliver messages from device 111 with a destination port 67, indicating a DHCP message, to the DHCP relay agent. The relay agent determines that the DHCP message is intended for a host having the IP address in the yiaddr field 214. However, this IP address may not be unique. For example, the IP address in the yiaddr field 214 might be X.Y.Z.001 that is used by both host 124 on the green VPN and host 128 on the red VPN.

The relay agent determines which network to send the response message based on the network-segment qualifier and the map. For example, if the value included in the network identifier field 252 is "GREEN", the response is sent to the host having IP address X.Y.Z.001 on the green VPN. The green VPN is associated with interface 104a in the map 105.

In some embodiments, the network identifier is associated with more than one segment and the response is sent on the interfaces for all such segments. Also, the network identifier may be associated with more than one segment so that the response is sent only in one segment based on the value in the segment identifier field 254. For example, if the value in the segment identifier is "X.Y.Z.2", then the response is sent over the interface 104b having IP address X.Y.Z.2 to the host 128 having IP address X.Y.Z.1 on the red VPN. The red VPN and red VPN IP address X.Y.Z.000 are associated with interface 104b in the map 105.

The relay agent generates the response message 326 based on the response message 324, and sets the port to 68, indicating a DHCP message for receipt by a client. In some embodiments, the relay-agent option is removed from the message 326 by the relay agent before sending to the host. At time tD, message 326 is sent. For example, message 326 is sent through interface 104b.

Using these techniques, a configuration server, such as a DHCP server, can provide the same network address for several hosts spread over different networks, such as different VPNs. The relay agents on the intermediate devices sends the configuration information to the proper host based on the qualifier, such as the VPN name, included in the messages between relay agent and configuration server.

Method at the Server

Figure 4:
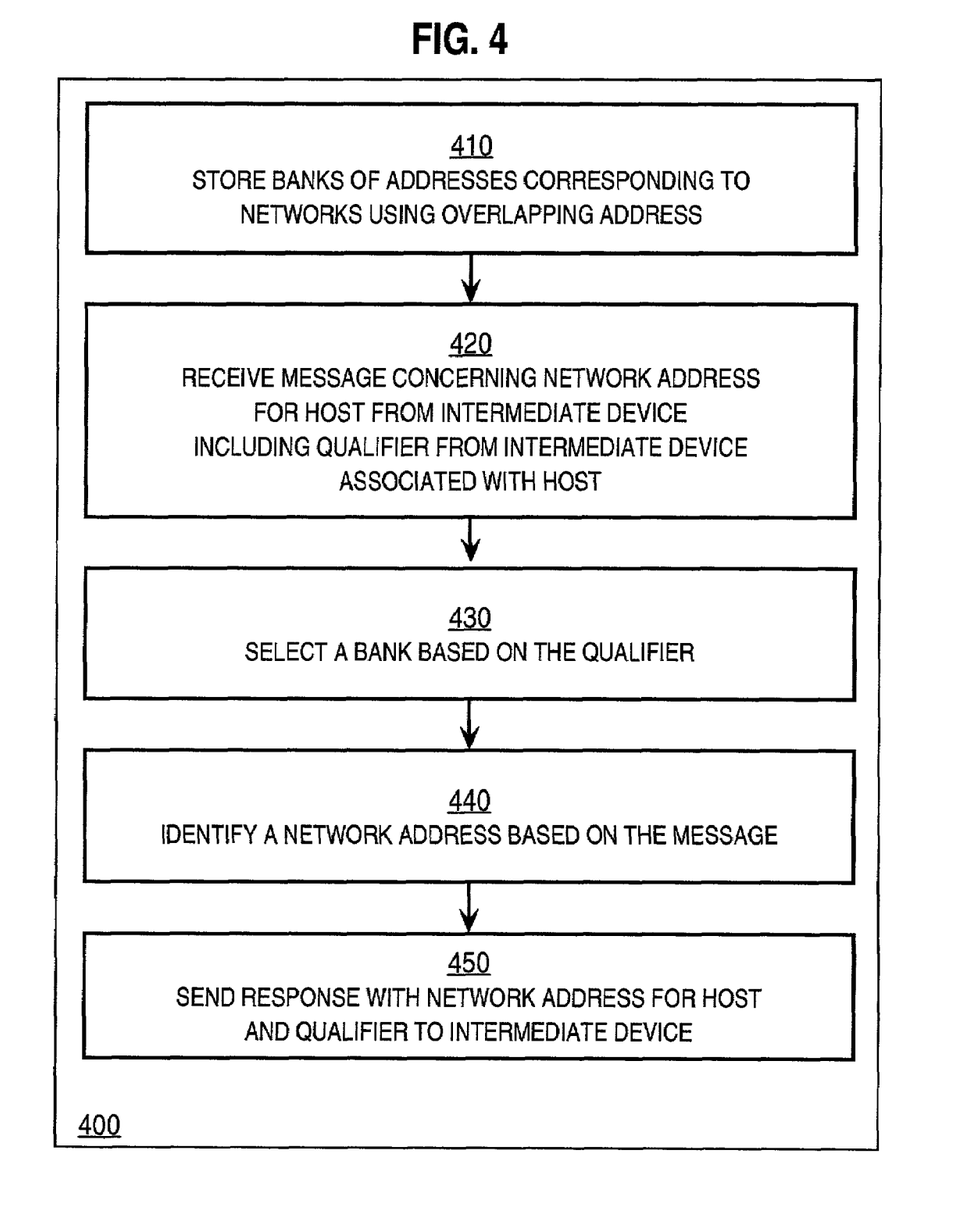
FIG. 4 is a flowchart that illustrates one embodiment of a method at a server for managing overlapping network address spaces.

FIG. 4 is a flowchart that illustrates one embodiment 400 of a method at a server for managing overlapping network address. Although steps are shown in a particular order in FIG. 4 and subsequent flowcharts, in other embodiments the steps can proceed in a different order, or can overlap in time.

In step 410, the server stores banks of addresses corresponding to the networks using overlapping addresses. For example, DHCP server 110 stores bank 115a of IP addresses X.Y.Z.1 to X.Y.Z.127 for the red VPN, and stores bank 115b of IP addresses X.Y.Z.1 to X.Y.Z.255 for the green VPN. Each bank includes a pool of available addresses and a data structure of leased addresses. Initially, all the addresses in each bank are in the pool of available addresses for the bank. As each address is leased to a host on one of the networks, the address is moved from the pool to the data structure of leased address in the bank corresponding to that network. As the lease on each address expires, the address is moved from the data structure of leased addresses to the pool of available addresses. In some embodiments, a network identifier is stored with each bank of addresses. For example, data indicating "RED" is stored in association with the first bank 115a and data indicating the value "GREEN" is stored in association with the second bank 115b.

The configured pools exclude addresses that are in use. For example, the addresses of the routers are excluded from the DHCP pools so that the DHCP server cannot offer them to clients.

In step 420, the server receives a request from a relay agent on an intermediate device concerning a network address for a host connected to the intermediate device. The request includes a network-segment qualifier associated with the host by the relay agent. For example, the request includes a network-segment qualifier in the DHCP relay agent options portion of the message and the network-segment qualifier contains the data "RED" and "X.Y.Z.1."

In step 430, the server selects a bank of addresses based on the network identifier in the network-segment qualifier. For example, the server selects the bank 115a associated with the value "RED" based on the value "RED" in the network-segment qualifier.

In step 440 a network address is identified based on the request. If the request is a DISCOVER type, the network address is selected from the pool 114 of available addresses in the selected bank 115a. In some embodiments, an address is selected from a subset of the pool based on the segment identifier. For example, if the segment is identified by the interface address X.Y.Z.1, then an address is selected from available addresses in a subnet, such as a 32-address subnet extending from X.Y.Z.1 (through X.Y.Z.031). For example, the address X.Y.Z.1 is selected. If the segment is identified by the interface address X.Y.Z.065, then an address is selected from available addresses in a second subnet, such as a 64-address subnet from X.Y.Z.065 through X.Y.Z.127.

If the request is a REQUEST or RENEW type, the network address is already assigned or offered and is included in either a ciaddr field of the client message, if the client is already using the address and is renewing an existing lease, or in a 'requested-address' DHCP option if the client is REQUESTing after an OFFER. That is, the network address is identified based on the ciaddr field in the request. For example, the address X.Y.Z.001 is found in the ciaddr field of the request. The configuration information associated with the network address can be found in the data structure 116 in the selected bank 115a.

In step 450, a response is generated and sent based on the request and the identified network address. For example a DHCP ACK type response is sent or a DHCP OFFER type response is sent. The identified address is in the response. For example, the value "X.Y.Z.001" is in the yiaddr field 214 of the response. The response also includes the network-segment qualifier received in the request. For example the response includes a network-segment qualifier in the DHCP relay agent options portion of the message, and the network-segment qualifier contains the data "RED" and "X.Y.Z.000."

Method at the Relay Agent

Figure 5:
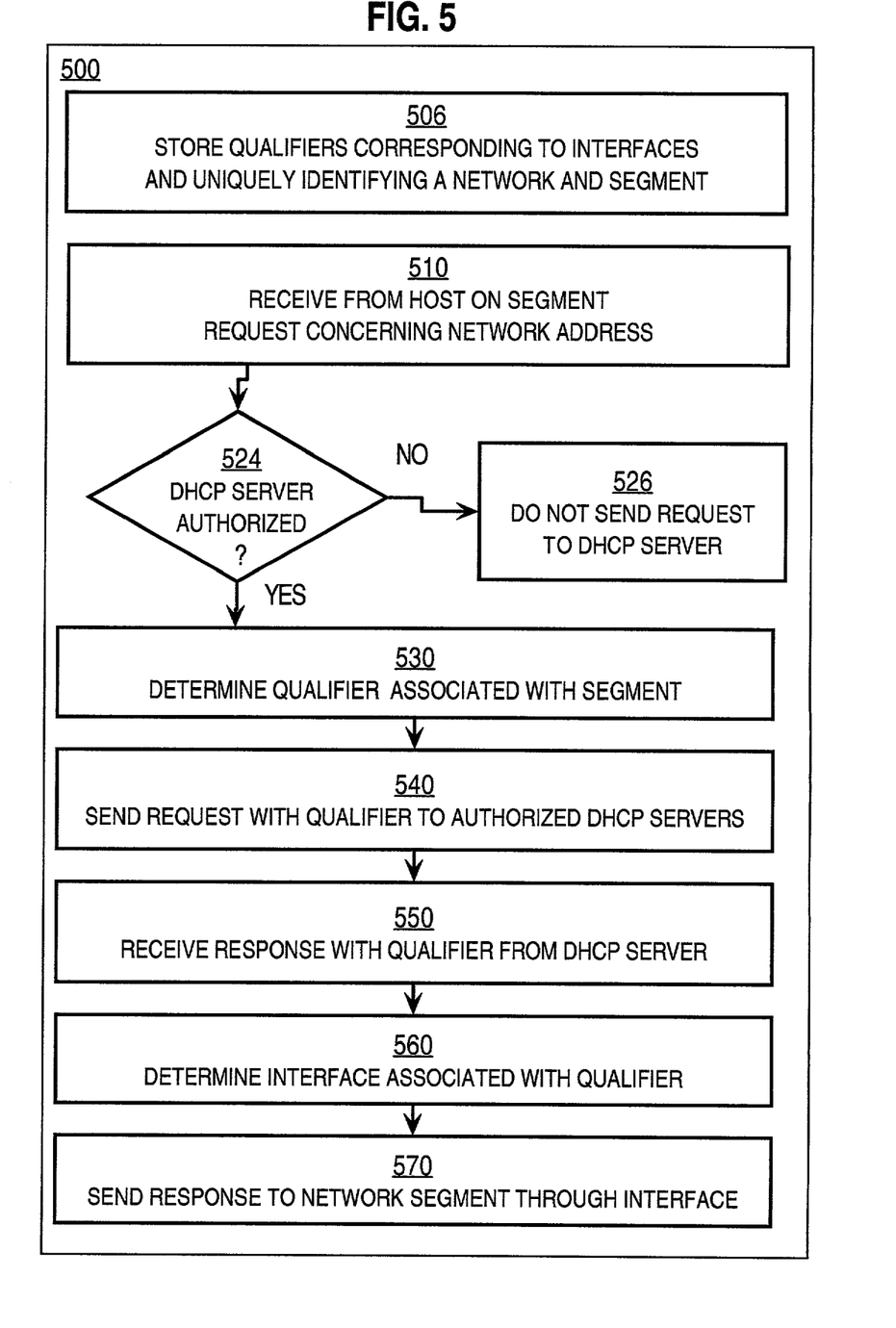
FIG. 5 is a flowchart that illustrates one embodiment of a method at an intermediate device for processing configuration messages for networks using overlapping network address spaces.

FIG. 5 is a flowchart that illustrates one embodiment 500 of a method at an intermediate device for managing overlapping network addresses.

In step 506, the interfaces of the intermediate device are associated with a network and a network segment. For example, a network administrator employing a configuration process provides a network identifier for the networks connected to the intermediate device and a subnet for each network segment connected to the intermediate device. As a specific example, the configuration process associates interface 104a with the green VPN and interfaces 104b and 104e with the red VPN, and identifies DHCP server 110 on device 111. In the example embodiment, the router is configured with the subnets that its interfaces are attached to, and with an address on the subnet for each interface. The configuration provides, in this example, 64 addresses starting at X.Y.Z.2 as the subnet of the segment of the green VPN connected to interface 104a based on the second bank 115b of addresses, and 32 addresses starting at X.Y.Z.2 and 64 addresses starting at X.Y.Z.064 as the subnets of the segments of the red VPN connected to interfaces 104b and 104e, respectively, based on the first bank 115a of addresses. Thus overlapping subnets are provided for the green VPN segment connected to interface 104a and the red VPN segment connected to interface 104b. The VPN name and subnet associated with each interface are stored in the map 105 on the router 102b. For example, "GREEN" "X.Y.Z.2" is associated with interface 104a in map 105. Similarly, "RED" "X.Y.Z.2" is associated with interface 104b in map 105; and "RED" "X.Y.Z.064" is associated with interface 104e in map 105. The VPN name and subnet constitute the qualifier associated with the interface in this example.

In step 510 a request is received at the intermediate device from a host for leased network address services. For example, a broadcast DISCOVERY type DHCP message is received from the DHCP client 125 on host 128 at interface 104b.

In step 524, the relay agent on the intermediate device determines whether the servers connected to the intermediate device are authorized to provide leased network address services. For example, relay agent 103 determines that DHCP server 110 on device 111 is authorized to receive DHCP messages from interface 104b of router 102b.

If the server outside the private network is not authorized to provide leased network address services, then the request is not sent to the server, as indicated by step 526. In some embodiments, in step 526 the request is sent to a server on the same VPN, which is authorized to receive DHCP messages.

If the server outside the private network is authorized to provide leased network address services, then control passes to step 530. In step 530 a qualifier associated with the segment including the host is determined. For example, using map 105, it is determined that the host is on the segment connected to interface 104b which is associated with the network-segment qualifier having values "RED" "X.Y.Z.2."

In step 540 the relay agent sends a request to the authorized DHCP server. In a DHCP relay agent options portions of the DHCP message, the request sent includes the values for qualifier determined in step 530. For example, a modified DISCOVERY type message is sent from the relay agent 103 to the DHCP server 110. The modified message includes the value "RED" in the network identifier field 252 and the value "X.Y.Z.2" in the segment identifier field 254.

In response to the modified request sent to the DHCP server, the DHCP server returns a response. In step 550, the response is received at the relay agent. The response includes the network-segment qualifier in the DHCP relay agent options portion of the message. The response also includes the IP address of the host on the private network, for example, in the DHCP yiaddr field 214. For example, a response of type OFFER includes IP address X.Y.Z.001 and the qualifier "RED" "X.Y.Z.000." The relay agent cannot rely on the IP address to direct the packet to the host, because the same IP address may apply to hosts on more than one network. For example, an IP address of X.Y.Z.001 applies to both the host 124 in the green VPN and the host 128 in the red VPN.

In step 560, the relay agent determines the interface associated with the qualifier. For example, the relay agent 103 uses the information in map 105 to determine that interface 104b is associated with the segment identifier, X.Y.Z.000. For another example, the relay agent 103 uses the information in map 105 to determine that the interface 104a is associated with the network identifier, "GREEN."

In step 570, the relay agent sends a response to the host on the network segment connected to the interface determined in step 560. For example, a DHCP OFFER response is sent through interface 104b determined in step 560. The response is then received at host 128 where it is directed to DHCP client 125 based on the well-known port 68.

In this way, the same IP address, e.g., X.Y.Z.001, can be assigned to the host 128 on the red VPN and host 124 on the green network. The DHCP traffic is directed to the proper network and network segment based on the qualifier inserted by the relay agent and returned by the DHCP server.

Method at the Client

Embodiments do not involve a change in the processing steps of the client, such as the DHCP client. The usual processing by the client will effect a different result, according to embodiments of the invention, because when the client sends a request, the relay agent at the intermediate device will receive the request and handle it properly, as described above with reference to FIG. 5.

Making no changes to the client is an advantage of the techniques disclosed because tens of millions of DHCP clients have already been deployed over the last decade. It will be expensive and take many years to even replace a significant fraction of the deployed DHCP clients. Thus it is highly desirable to make no changes to the client processes.

Hardware Overview

Figure 6:
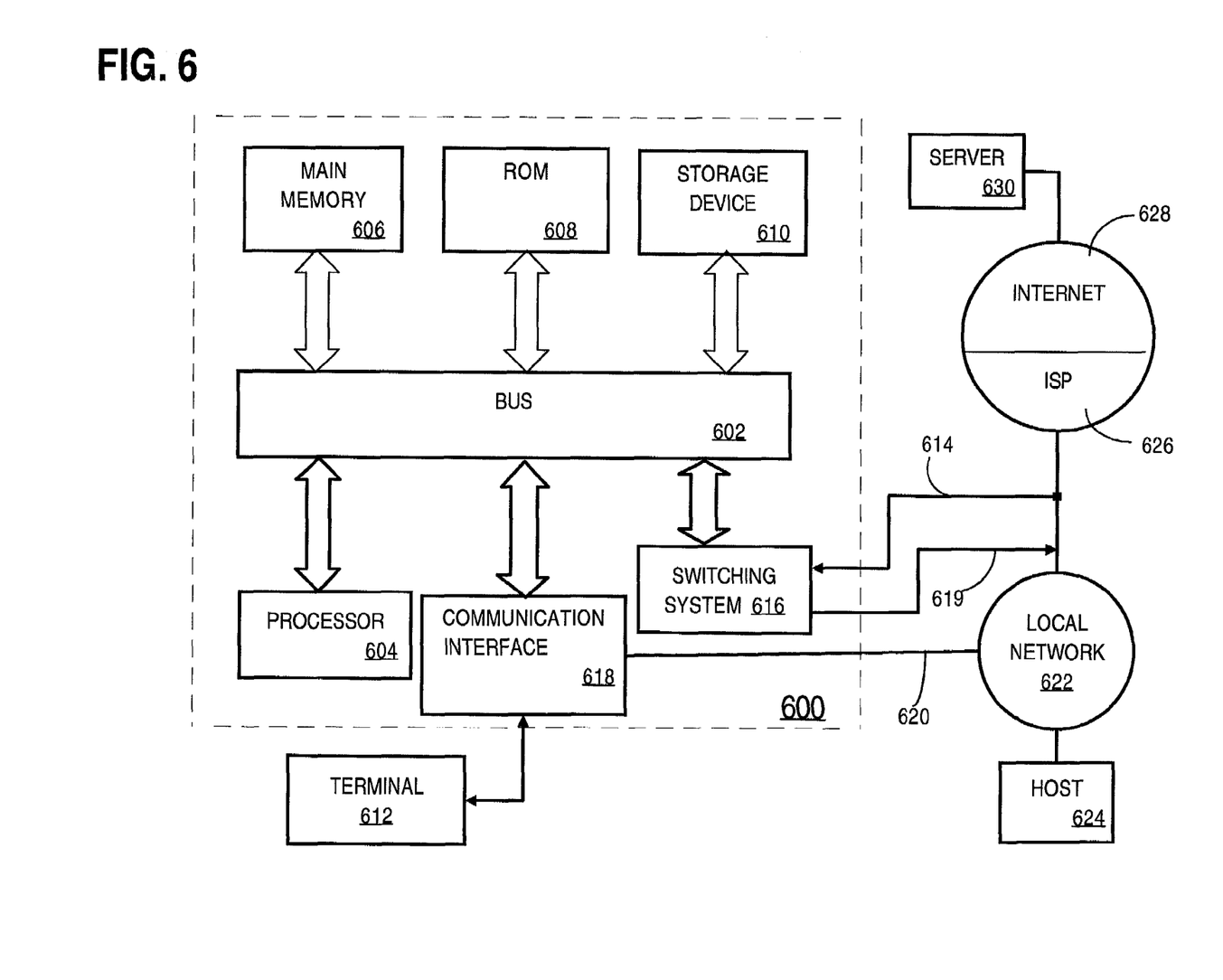
FIG. 6 is a block diagram that illustrates a router upon which an embodiment may be implemented.

FIG. 6 is a block diagram that illustrates a computer system 600 upon which an embodiment of the invention may be implemented. The relay agent aspect of a preferred embodiment is implemented using one or more computer programs running on a network intermediate device, such as a router device. Thus, in this embodiment, the computer system 600 is a router, such as router 102b. The DHCP server aspect of an embodiment also may be implemented using one or more computer programs running on an appropriate host processor having the general configuration of computer system 600.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. In some embodiments, interface 618 is a conventional serial interface such as an RS-232 or RS-422 interface. An external terminal 612 or other computer system connects to the computer system 600 and provides commands to it using the interface 618. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to predetermined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for managing overlapping network addresses for multiple networks. According to one embodiment of the invention, managing overlapping network addresses for multiple networks is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP)

626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for managing overlapping network addresses for multiple networks as described herein.

The received code may be executed by processor 604 as it is received, and/or stored in storage device 610, or other non-volatile storage for later execution. In this manner, computer system 600 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing leased network addresses for a plurality of networks using overlapping address spaces, the method comprising the computer-implemented steps of:
    storing a plurality of banks of addresses, wherein each said bank includes a pool of available addresses and a data structure of leased addresses, corresponding to the plurality of networks, wherein at least one particular set of one or more network addresses is included in more than one bank of the plurality of banks;
    receiving a request for a network address for a host on a first network of the plurality of networks from a relay agent on an intermediate device connected to the first network, the request including a qualifier associated with the first network by the relay agent;
    based on the qualifier, selecting a first bank of addresses from the plurality of banks;
    identifying a first network address from the first bank of addresses based at least in part on the request; and
    sending to the relay agent a response for the host, the response indicating the first network address and the qualifier.

2. A method as recited in claim 1, wherein said step of storing the plurality of banks further comprises the step of storing data indicating a value for the qualifier in association with each bank of the plurality of banks.

3. A method as recited in claim 1, wherein the qualifier further includes a segment identifier of a segment of the first network.

4. A method as recited in claim 3, wherein said step of identifying the first network address from the first bank is further based on the segment identifier.

5. A method as recited in claim 1, wherein the request is formatted according to a dynamic host configuration protocol (DHCP).

6. A method as recited in claim 5, wherein the qualifier is included in the request in a set of optional fields associated with the relay-agent in the DHCP.

7. A method as recited in claim 1, said step of sending the response further comprising the step of formatting the response according to a dynamic host configuration protocol (DHCP).

8. A method as recited in claim 7, wherein the qualifier is included in the response in a set of optional fields associated with the relay-agent in the DHCP.

9. A method as recited in claim 1, wherein:
    the request is to lease a new network address for the host; and
    said step of identifying the first network address comprises selecting the first network address from a pool of available network addresses in the first bank.

10. A method as recited in claim 1, wherein:
    the request involves an already leased network address for the host; and
    said step of identifying the first network address comprises retrieving the first network address from a data structure of leased network addresses in the first bank.

11. A method for managing leased network addresses for a plurality of networks using overlapping address spaces, the method comprising the computer-implemented steps of:
    receiving, at a relay agent executing on an intermediate device connected to a first network of the plurality of networks, a first request for a network address from a host on the first network;
    associating a particular qualifier with the first network; and
    sending to a configuration server a second request for a network address for the host, the second request including the particular qualifier.

12. A method as recited in claim 11, wherein:
    the intermediate device includes a plurality of interfaces connected to one or more segments of one or more networks of the plurality of networks;
    the method further comprises the step of storing a plurality of qualifiers corresponding to the plurality of interfaces, each qualifier uniquely identifying one network of the plurality of networks; and
    said step of associating the particular qualifier with the first network further comprises the step of retrieving the particular qualifier corresponding to a particular interface connected to the host.

13. A method as recited in claim 12, wherein each qualifier includes a segment identifier uniquely identifying a segment of a network of the plurality of networks, the segment connected to a corresponding interface of the plurality of interfaces.

14. A method as recited in claim 11, wherein:
    the host is on a particular segment of the first network;
    the particular segment is connected to a particular interface of the intermediate device; and
    the particular qualifier includes a segment identifier for the particular segment.

15. A method as recited in claim 11, wherein the first request is formatted according to a dynamic host configuration protocol (DHCP).

16. A method as recited in claim 11, said step of sending the second request further comprising the step of formatting the second request according to a dynamic host configuration protocol (DHCP).

17. A method as recited in claim 16, wherein the qualifier is included in the second request in a set of optional fields associated with the relay-agent in the DHCP.

18. A method as recited in claim 11, further comprising the steps of:
    in response to sending the second request, receiving from the configuration server a first response, the first response indicating the particular qualifier and a particular network address for the host;
    determining that the particular qualifier is associated with the first network; and
    sending a second response to the host on the first network, the second response including the particular network address.

19. A method as recited in claim 18, wherein the second response does not include the qualifier.

20. A method as recited in claim 18, wherein the first response is formatted according to a dynamic host configuration protocol (DHCP).

21. A method as recited in claim 20, wherein the qualifier is included in the first response in a set of optional fields associated with the relay-agent in the DHCP.

22. A method as recited in claim 18, wherein:

the host is on a particular segment of the first network;

the particular segment is connected to a particular interface of the intermediate device; and the particular qualifier includes a segment identifier for the particular segment.

23. A method as recited in claim 22 wherein:

said step of determining that the particular qualifier is associated with the first network further comprises determining that the segment identifier is associated with the particular interface; and said step of sending the second response to the host comprises sending the second response through the particular interface.

\* \* \* \* \*

UNITED STATES PATENT AND TRADEMARK OFFICE
CERTIFICATE OF CORRECTION

PATENT NO.         : 7,152,117 B1
APPLICATION NO. : 10/053759
DATED                : December 19, 2008
INVENTOR(S)      : Mark Stapp et al.

It is certified that error appears in the above-identified patent and that said Letters Patent is hereby corrected as shown below:

On the title page and column 1, line 4:
In the TITLE
(54) Delete "TECHNIQUES FOR DYNAMIC HOST CONFIGURATION USING OVERLAPPING NETWORK"
And insert --TECHNIQUES FOR DYNAMIC HOST CONFIGURATION USING OVERLAPPING NETWORK ADDRESSES--.

In the REFERENCES CITED
(56) Delete "Primarity Disconnected Operation: Experiences with Ficus Heidemann (1992) ftp.cs.ucla.edu/pub/ficus/WorkMgtRep|Data_92.ps.gz." and insert
-- Primarily Disconnected Operation: Experiences with Ficus Heidemann (1992) ftp.cs.ucla.edu/pub/ficus/WorkMgtRep|Data_92.ps.gz.--.

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,152,117 B1 | Page 1 of 1 |
| APPLICATION NO. | : 10/053759 | |
| DATED | : December 19, 2006 | |
| INVENTOR(S) | : Mark Stapp et al. | |

It is certified that error appears in the above-identified patent and that said Letters Patent is hereby corrected as shown below:

On the title page and column 1, line 4:
In the TITLE
(54) Delete "TECHNIQUES FOR DYNAMIC HOST CONFIGURATION USING OVERLAPPING NETWORK"
And insert --TECHNIQUES FOR DYNAMIC HOST CONFIGURATION USING OVERLAPPING NETWORK ADDRESSES--.

In the REFERENCES CITED
(56) Delete "Primarity Disconnected Operation: Experiences with Ficus Heidemann (1992) ftp.cs.ucla.edu/pub/ficus/WorkMgtRep|Data_92.ps.gz." and insert
-- Primarily Disconnected Operation: Experiences with Ficus Heidemann (1992) ftp.cs.ucla.edu/pub/ficus/WorkMgtRep|Data_92.ps.gz.--.

This certificate supersedes Certificate of Correction issued March 6, 2007.

Signed and Sealed this

Twenty-seventh Day of March, 2007

JON W. DUDAS
*Director of the United States Patent and Trademark Office*